United States Patent [19]

Sweeney

[11] Patent Number: 4,961,477

[45] Date of Patent: Oct. 9, 1990

[54] WHEEL CHAIR TRANSPORTER

[76] Inventor: John F. Sweeney, 1138 BCS #1, Phoenix, Ariz. 85027

[21] Appl. No.: 203,913

[22] Filed: Jun. 8, 1988

[51] Int. Cl.⁵ .......................... B60P 1/43; B62K 27/12
[52] U.S. Cl. ...................................... 180/219; 180/209; 180/907; 280/210; 280/250.1; 280/296; 280/303; 280/304.1; 296/68; 414/495; 414/537; 414/921
[58] Field of Search ...................... 180/219, 907, 209; 280/202, 304.1, 210, 296, 303; 224/279, 310; 414/921, 537, 495; 296/68

[56] References Cited

U.S. PATENT DOCUMENTS

| | | | |
|---|---|---|---|
| 1,358,252 | 11/1920 | Schneider | 280/303 X |
| 1,369,116 | 2/1921 | Krahn | 280/296 |
| 2,919,658 | 1/1960 | Kakoska | 414/537 |
| 3,204,791 | 9/1965 | Williams | 414/537 |
| 3,452,893 | 7/1969 | Heflin | 224/310 X |
| 3,865,427 | 2/1975 | Delany | 414/921 X |
| 4,170,368 | 10/1979 | Southward et al. | 414/921 X |
| 4,278,387 | 7/1981 | Seguela et al. | 414/921 X |
| 4,354,791 | 10/1982 | Antonellis | 414/921 X |
| 4,415,056 | 11/1983 | Smith | 414/921 X |
| 4,459,663 | 7/1984 | Hems et al. | 414/921 X |
| 4,580,652 | 4/1986 | Turner et al. | 414/921 X |
| 4,671,730 | 6/1987 | Gateau | 414/921 X |
| 4,693,488 | 9/1987 | Bernocco | 280/302 X |

FOREIGN PATENT DOCUMENTS 2483222  12/1981  France ................................ 414/921

*Primary Examiner*—Mitchell J. Hill
*Attorney, Agent, or Firm*—James F. Duffy

[57] ABSTRACT

A wheelchair transporter for transferring a handicapped person, while seated in a wheelchair, from a ground level into an operative position on a motorcycle. The wheelchair is intended for independent use, but is designed to couple with a glide track on the motorcycle. The glide track receives rollers mounted on the wheelchair and guides the wheelchair into operational position on the motorcycle. The motorcycle includes a support unit for stabilization during the transfer of the wheelchair, and in the course of initiating and ending a ride on the motorcycle by a handicapped person seated in the wheelchair, operating the motorcycle.

7 Claims, 3 Drawing Sheets

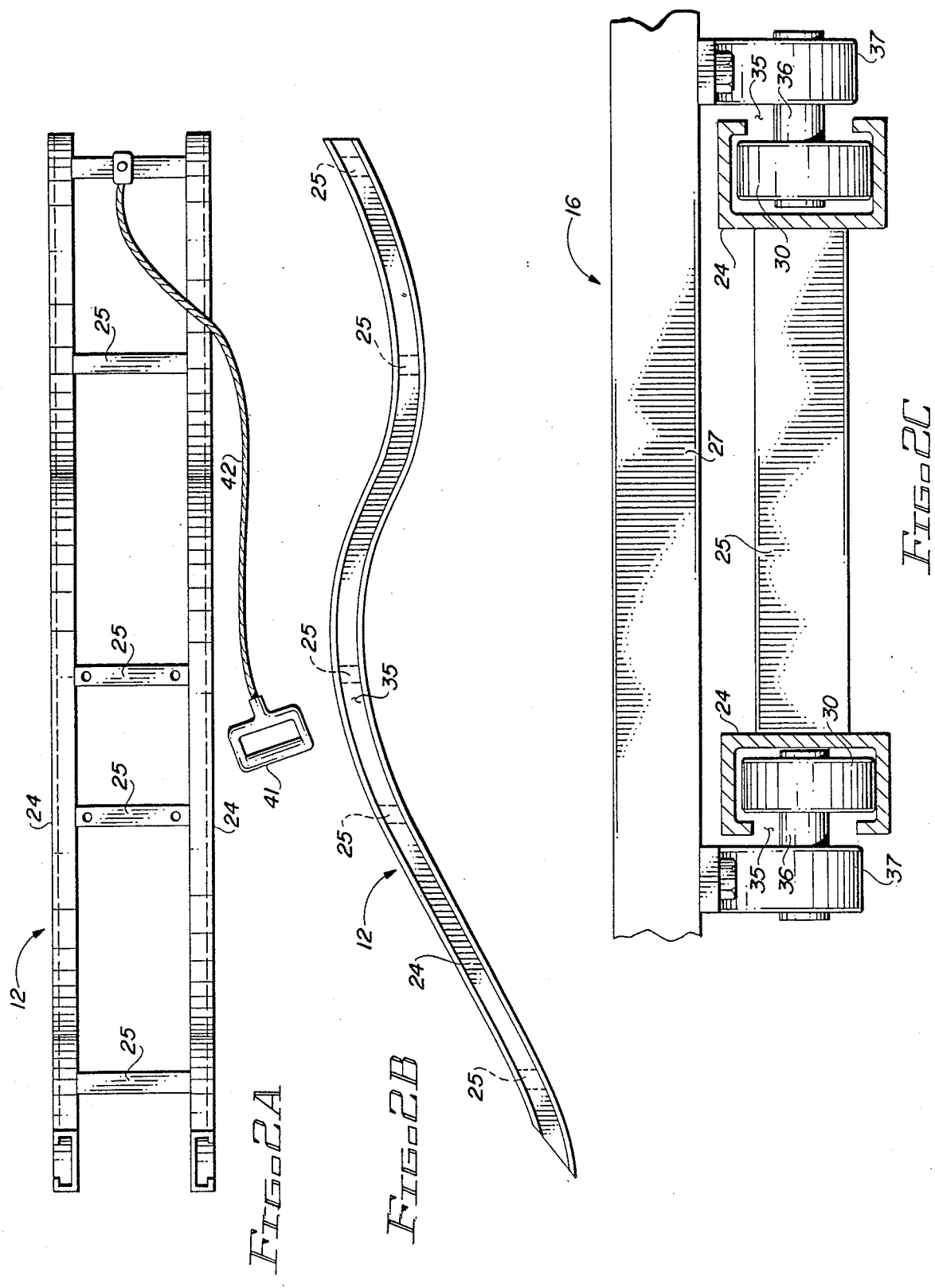

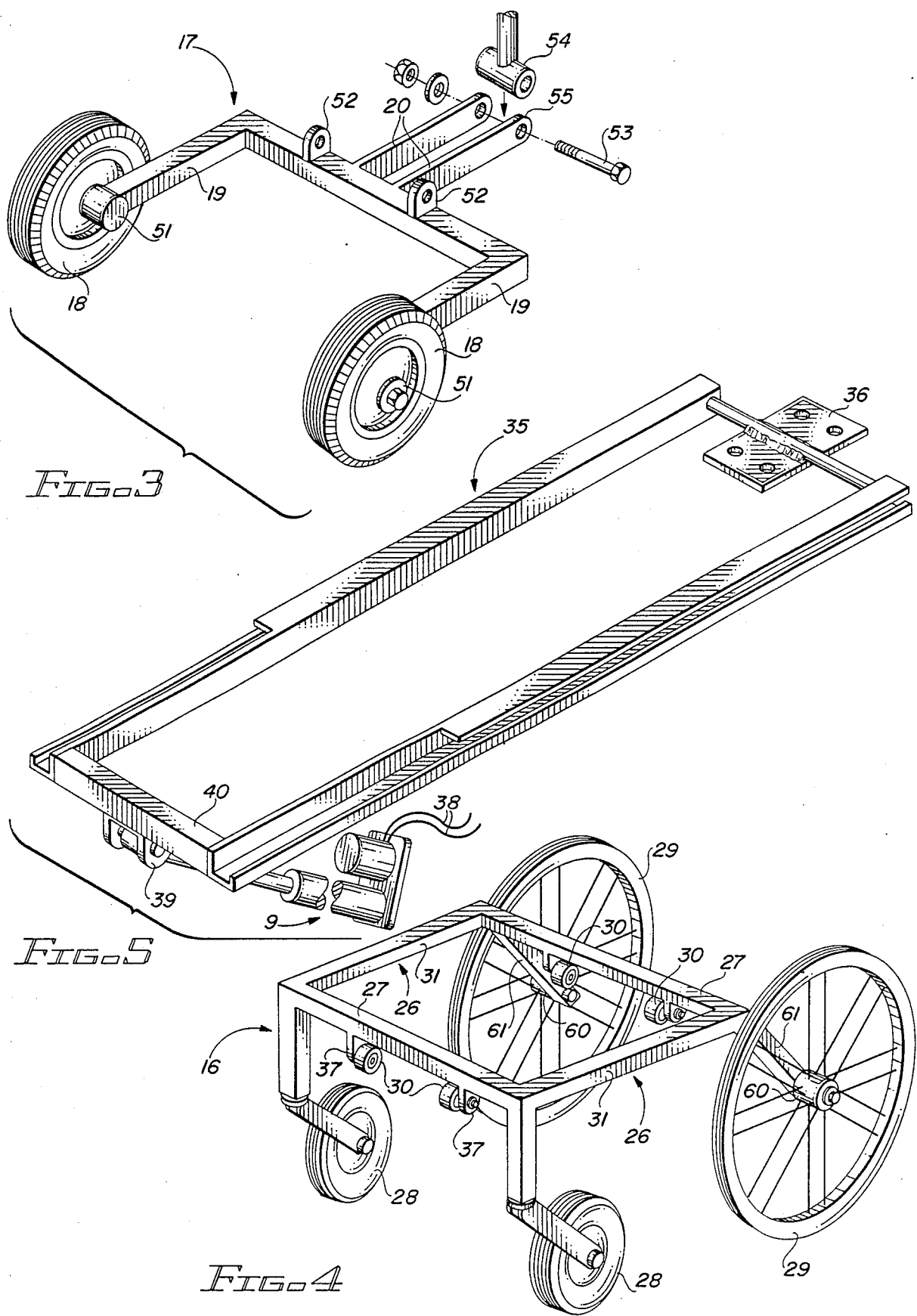

WHEEL CHAIR TRANSPORTER

BACKGROUND

1. Field of the Invention

The invention relates to a mechanism that attaches to a vehicle, (herein "Vehicle" shall be in many cases substituted for motorcycle, scooters, or three- and four-wheeled all-terrain vehicles), in such a unique way that it provides a person confined to a wheelchair, and without assistance, a safe, reliable and inexpensive means of transportation; while at the same time, giving them the feeling of freedom and independence.

2. Prior Art

At the present time, there are very few efficient and satisfactory means for a person confined to a wheelchair to be transported from place to place—without assistance—or the use of expensive, custom-made vehicles, such as vans. Other alternatives are battery operated devices, such as scooters, which are limited to short distances and sidewalk areas. To use these devices, a handicapped person must transfer from his own wheelchair to the vehicle of choice, and sometimes needs assistance.

To overcome the above-stated shortcomings, I have provided, in this invention, a means, whereby a handicapped person, confined to a wheelchair may be transferred, while remaining in the wheelchair, onto a vehicle, without assistance; thus providing a much better means for transportation and most of all, the Wheelchair Transporter provides a feeling of freedom and independence.

SUMMARY OF THE INVENTION

The invention provides an improvement to vehicles such as motorcycles, scooters, and three- or four-wheeled all-terrain vehicles. The improvement permits a wheelchair bound person to operate one of these vehicles while seated in the wheelchair in which she may have approached the vehicle. The invention places the wheelchair with the handicapped person therein in the operator's position on the vehicle.

The invention includes a glide track coupled to the vehicle and a wheelchair adapted for coupling to the glide track. Upon so coupling, the wheelchair moves along the glide track to the vehicle operator's position.

All obstructions beneath the wheelchair have been eliminated so that the chair moves on to the vehicle without interference. The glide track has guides along which rolla-wheels on the chair roll. The guides captivate the rolla-wheels so that the rollers move along with no possibility of disengagement.

Two wheeled vehicles, or the like, are provided with stabilization means to maintain the vehicle in an upright position when the vehicle is unattended or while the handicapped person moves on or off the vehicle with her wheelchair.

The stabilization means has outriggers which may be lifted when vehicle support is not required. In a preferred embodiment of the invention, the outriggers are comprised of free wheeling wheel supports.

DESCRIPTION OF THE DRAWINGS

Readers will find further objectives and advantages of the invention from a consideration of the ensuing description and the accompanying drawings:

FIG. 2A—FIG. 2A is a top view of the glide track and rollers and crossbar of the wheelchair.

FIG. 2B—FIG. 2B is a side view of the glide track of FIG. 2A with hand puller also shown.

FIG. 2C—FIG. 2C is a rear view of the glide track and rollers of FIG. 2A.

FIG. 3—FIG. 3 is a perspective view of the support unit.

FIG. 4—FIG. 4 is a perspective view of the wheelchair chassis and wheels.

FIG. 5—FIG. 5 is a perspective view of a straight glide track attached to a hinging bracket with a power source.

A DETAILED DESCRIPTION OF THE INVENTION

Figure 1:
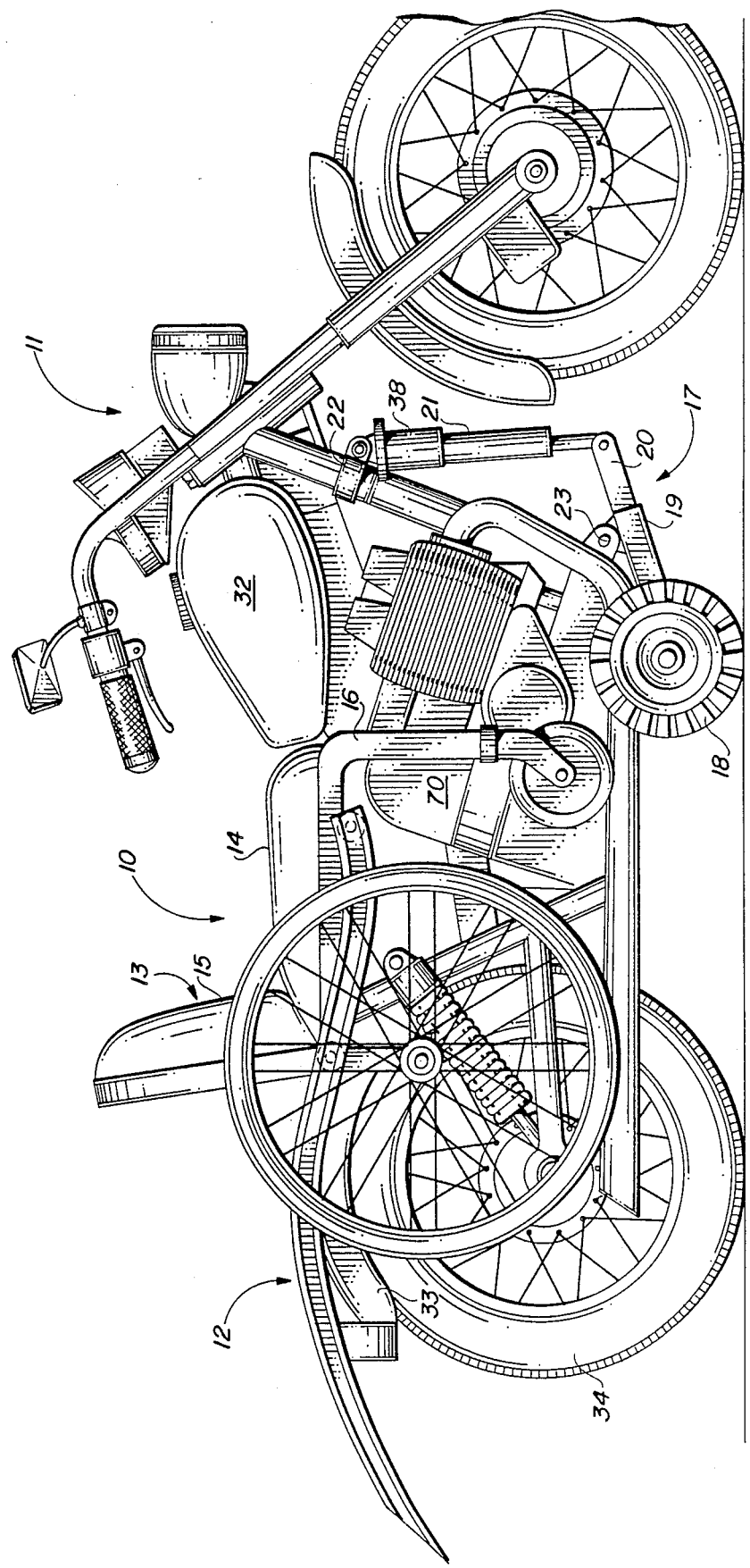
FIG. 1—FIG. 1 is a side view of a motorcycle with wheelchair positioned for riding, and with support unit in place.

The invention, Wheelchair Transporter 10, is comprised of three different units: (1) the wheelchair unit 13, (2) the glide track 12, and (3) the support unit 17. When the glide track 12 and support unit 17 are supported by a vehicle 11, and are working in conjunction with the wheelchair 13, they provide the means whereby a person confined to wheelchair 13 may be able to transfer herself securely on to vehicle 11 in such a position that the person can operate vehicle 11 satisfactorily, while remaining on the wheelchair.

Wheelchair 13 is an attractive, comfortable, lightweight, sports-type wheelchair, which resembles existing wheelchairs. It can be used independently of the Wheelchair Transporter 10 but is unique in its design because of the following features: a tubular metal frame (see FIG. 4) gives it ample strength. At the same time, it has no obstruction beneath the seat area, or between the wheels, thus allowing it to clear all obstructions such as the glide track 12 when mounting the "vehicle" or motorcycle 11.

Attached to the front, bottom most part of the wheelchair frame 16 and connected to both sides 20 of the frame 16 are two conventional wheelchair caster wheels 28. From caster wheels 28, the frame member 26 slants in an upwardly direction to the seat section. The purpose of this angling is to provide the person in the wheelchair a very comfortable means for support of their legs and to hold the legs apart while mounting the vehicle.

FIG. 4 shows the tubular metal frame 16 composed of four support areas. The seat support rails 31 of the frame 16 are horizontal. Two support areas of frame 16, frame members 61, slope downward from rails 31 in the seat area in frame 16 to the rear wheels 29. The other two, frame members 26, slope downwardly to the front caster wheels 28. The caster wheels 28 are connected to frame member 26 at the lower front end of frame 16.

The cross frames 27 are attached horizontally to the support rails 31 at the front and back of the seat support area. The rear wheels 29 are connected at the axles 60 to the part of the frame 16, frame members 61, which slope downwardly to the rear.

Rollers 28 are supported by roller pins 36 (FIG. 2C), which are supported by roller support bracket 37. Roller support brackets 37 are supported by cross frame members 27.

Frame member 61 includes a support on which to mount the wheelchair's conventional wheels 29 and push rims. (Push rims not illustrated.) For this purpose, frame 26 of the wheelchair is slanted in a downwardly direction beginning just behind the seat support section 31. See FIG. 4. To provide a means for allowing the wheelchair 13 to roll upon glide track 12, four rollers 30 are attached to the bottom of the cross frame 27 of the wheelchair frame 16; two on the front cross frame 27 and two on the rear cross frame 27. Cross frames 27 are located equal distances apart and generally parallel to each other.

A glide track 12 is provided which, when mounted on to a motorcycle 11, provides a safe and secure means for transferring wheelchair 13, with its occupant, from the ground on to motorcycle 11, while the occupant remains seated in the wheelchair.

Glide track 12 is constructed of two curved metal guide tracks 24, parallel to each other and extending from the fuel tank 32 of motorcycle 11 in a backwardly direction along each side, atop the frame of motorcycle 11, up and over the rear fender 33, and in a downwardly direction behind the rear wheel 34 of motorcycle 11. To provide a means to separate the guide tracks 24 and attach the assembly 12 to the motorcycle 11, several cross braces 25 are attached to and between the two parallel, curved glide tracks 24. Glide track 12 is designed in such a way as to receive the rollers of the wheelchair and hold them in place securely while the wheelchair and the occupant are traveling upon the "vehicle."

Means are provided to allow the glide tracks 24 to receive the rollers 30 of wheelchair 13. Glide tracks 24 are enclosure item like enclosure, like tracks, located at one end exactly the right height H (FIG. 1) from the ground to receive rollers 30 of wheelchair 13. Wheelchair 13 is rolled upon glide tracks 24 from ground level. Openings or grooves 35 are cut along the side of glide tracks 24 for clearance of roller pins 36 (FIG. 2C). To allow the wheelchair to clear all obstacles of a vehicle, while mounting and riding a vehicle, for example, motorcycle 11, the glide tracks may be straight, bent or curved.

FIG. 2A is a top view of glide tracks 24 connected by cross braces 25. FIG. 2B is a side view of curved glide track 24 and grooves 35. Wheelchair chassis rollers 30 are inside glide tracks 24 with roller pins 36 protruding out through grooves 35 and connected to roller support brackests 37 which are connected to cross frames 27.

Alternatively, there is a glide track 35 adapted to other vehicles, such as three- or four-wheeled, all-terrain vehicles. Said glide track 35 may be slightly curved or even straight (FIG. 5), held apart at one end by a hinging bracket 36, supported by a vehicle (not shown) to provide the means to allow the glide ramp 35 to raise up or down at the opposite end by a power source 38 connected to a clevis bracket 39 of the cross brace 40. When this type glide track is used wheelchair and occupant are lifted up vertically by means of the power source 38 far enough to clear all obstruction. The occupant then pulls himself forward into an operating and riding position.

FIG. 5 is a perspective view of the straight glide track 35 supported at one end by hinging bracket 36 and the other end by cross brace clevis bracket 39 connected to a power source 38.

Means of rolling wheelchair 13 and its occupant up the glide track 12 are provided. A loading handle 41 is attached by cable or flexible cord 42 at the frontmost part of glide track 12 and extends backwardly, allowing the person in the wheelchair to reach it and pull herself, along with the wheelchair, up the glide track 12 into vehicle operating position.

There is a support unit 17, the purpose of which is to hold a motorcycle 11, in an upright position, while a wheelchair bound person is transferring, with her wheelchair, to and from or riding said motorcycle. To provide a means for raising or lowering the support wheels 18 to the desired position, a suitable power source 38 is used which shall be made to function by various methods, well known in the art, such as; manually, electric gear motors, hydraulic cylinders, hydraulic motors, etc. The aforementioned power source 38 is mounted at 22 on the motorcycle frame, just behing the front wheel and is connected to the centermost forward part of the support frame 19 at tongue 20.

To provide a control for the power source 38, a control 50 is mounted on motorcycle 11. When power source 38 is engaged in a downwardly direction, it forces tongue 20 of frame 19 of support unit 17 to move in the same direction. This, in turn, causes wheels 18 to rise.

The framework 19 for support unit 17 is manufactured in a horseshoe or U-shape extending across the front part of motorcycle 11, behind the front wheel, immediately in front of motor 70, and continues along both sides towards the rear of motorcycle 11. To provide support for support wheels 18, axles 51 are mounted at a 90° angle on each side of the motorcycle 11 at the rear end of support frame 19. Furthermore, support wheels 18 protrude outwardly, on the ground, far enough to provide ample balance to motorcycle 11 and at the same time allow the motorcycle to travel safely.

To couple motorcycle 11 to support unit 17, two support brackets 52 are attached to the front cross section of unit 17. These support brackets 52 also act as hinges when support unit 17 is raised or lowered. Power source 38 is used to raise or lower support unit 17. A short tongue is attached to the front and center of support unit 17, protruding forwardly. Power source 38 is coupled, e.g., via piston 21 to tongue 20. Therefore, when power source 38 is engaged, it will raise or lower support wheels 18 to the desired height as frame 19 pivots at brackets 52. Therefore, when the person in the wheelchair mounts the motorcycle, the vehicle being completely hand controlled and ready to operate, she simply starts vehicle 11 in a forward direction. When she reaches the desired speed, and can maintain balance, the power source 38 is engaged in a downwardly direction by actuation of control 50. As the front portion 20 of frame 19 is forced downwardly, support wheels 18 are forced upwardly, due to the fact that the hinges at brackets 52 cause a "teeter-totter" action, thus, enabling the person in the wheelchair to ride motorcycle 11 in a normal manner.

Power source 38 is mounted on the motorcycle frame, just behind the front wheel and connected to the center and forwardmost part of frame 19 by tongue 20, pin 53 passing through tubular bracket 54 and extrusions 55. Frame 19 is constructed of sturdy metal in a horseshoe shape extending across the front part of the motorcycle immediately in front of the motor and turning parallel along both sides towards the rear of motorcycle 11. The axles 51 are mounted at 90° angles on each side of the motorcycle, at the rear end on to support frame 19. Support wheels 18 are conventional wheels and are supported by axles 51. Brackets 37 are connected to cross members 27 of frame 19 and protrude upwardly to connect the unit to the motorcycle 11 via glide track 12.

While the above description contains many specifics, the reader should not construe these as limitations on the scope of the invention, but merely as exemplifications of preferred embodiments thereof. Those skilled in the art will envision many other possible variations that are within its scope. The glide track 12 might differ in shape and curves allowing it to be adapted to different models of vehicles. In some case, the glide track might even be straight.

Another example of possible variations might be that the glide track may be hinged in front and raised horizontally at the rear by a power source, which would raise the wheelchair and its occupant vertically high enough to clear the frame of the motorcycle or all terrain vehicle. Other examples of possible variations are the elimination of the support unit for three wheeled or similar vehicles, and the support unit frame would necessarily have to be modified for use on each type vehicle, especially scooters. The wheels of the support unit may be mounted on any area of the vehicle used, as long as they provide stability; that is, the further to the rear of the vehicle they are placed, the less they tend to slide on curves while on the other hand the further to the rear the less stability they provide.

Having thus described my invention, what I claim and desire to secure by letters of patent is:

1. A Wheelchair Transporter device for transferring a person confined to a wheelchair and said wheelchair, from ground level position by means of a glide track onto a motorcycle/scooter two wheeled vehicle, stabilized by means of a support unit, for transportation, in conjunction comprising:
   a two-wheeled vehicle;
   a wheelchair having a frame supported by four (4) wheels, said frame constructed without obstruction beneath a seat area, enabling said wheelchair to straddle said vehicle, and a crossframe supported by said frame, said crossframe containing roller pins, roller supports and rollers, said rollers providing the means for coupling the wheelchair with a glide track;
   a glide track coupled to said vehicle comprised of two elongated metal track-like tubing enclosures containing grooves and running parallel to each other and held apart by cross braces with a loading handle attached to one end of said glide track;
   a support unit attached to said vehicle by a hinging bracket, said support unit having a frame with a tongue and supported by wheels mounted on axles to provide the means for ground stabilization of said vehicle;
   a power unit coupling said support unit and said vehicle for raising said wheels from the ground; and
   said means for coupling said wheelchair, with its occupant, to said glide track, enabling wheelchair, with its occupant to transfer from a ground level onto said vehicle, stabilized by said support unit, for the purpose of transportation.

2. The transporter device of claim 1, wherein said frame with a seat area, providing support for a seat, said frame supported by four (4) wheels, has said wheels paired front and back, each pair separated by a crossframe connected across a front and back part of the seat area.

3. The transporter device of claim 2, wherein, said frame supported by four (4) wheels slopes downwardly from the seat support area to the front pair of wheels, and a front section of said frame contains the means for supporting said front wheels and separating the occupants legs, providing clearance during mounting and riding said vehicle.

4. The transporter device of claim 3, wherein said frame slopes downwardly from the seat area to the rear wheels and has coupled thereto support means for mounting the rear wheels.

5. The transporter device of claim 2 said rollers being received by the glide track and constructed of a round, free rolling wheel.

6. The transporter device of claim 1, said glide track being attached to said vehicle and supported at one end by a hinging bracket which allows said glide track to be raised or lowered at the an opposite end; and a power source connected by a clevis bracket to said vehicle and said glide track to raise and lower said track.

7. The transporter device of claim 1, further comprising a flexible cord, connected at one end to the glide track, and to said loading handle at the opposite end.

* * * * *